(12) United States Patent
Nakano

(10) Patent No.: US 9,970,531 B2
(45) Date of Patent: May 15, 2018

(54) SHIFT DEVICE

(71) Applicant: KABUSHIKI KAISHA TOKAI-RIKA-DENKI-SEISAK-USHO, Aichi (JP)

(72) Inventor: Yohei Nakano, Aichi (JP)

(73) Assignee: KABUSHIKI KAISHA TOKAI-RIKA-DENKI-SEISAKUSHO, Aichi (JP)

( * ) Notice: Subject to any disclaimer, the term of this patent is extended or adjusted under 35 U.S.C. 154(b) by 430 days.

(21) Appl. No.: 14/648,948

(22) PCT Filed: Oct. 22, 2013

(86) PCT No.: PCT/JP2013/078627
§ 371 (c)(1),
(2) Date: Jun. 2, 2015

(87) PCT Pub. No.: WO2014/087753
PCT Pub. Date: Jun. 12, 2014

(65) Prior Publication Data
US 2015/0308564 A1    Oct. 29, 2015

(30) Foreign Application Priority Data
Dec. 7, 2012    (JP) .................. 2012-268702

(51) Int. Cl.
*F16H 59/02* (2006.01)
*F16H 59/12* (2006.01)
(Continued)

(52) U.S. Cl.
CPC ............. *F16H 59/12* (2013.01); *B60K 20/02* (2013.01); *F16H 59/02* (2013.01); *F16H 59/08* (2013.01); *G05G 1/02* (2013.01)

(58) Field of Classification Search
CPC .......... F16H 59/12; F16H 59/02; F16H 59/08; B60K 20/02; G05G 1/02
See application file for complete search history.

(56) References Cited

U.S. PATENT DOCUMENTS

| 4,884,057 A | 11/1989 | Renault |
| 5,161,422 A * | 11/1992 | Suman ................... B60K 20/04 |
| | | 180/315 |

(Continued)

FOREIGN PATENT DOCUMENTS

| DE | 19509472 A1 | 9/1996 |
| DE | 10012753 A1 | 6/2001 |

(Continued)

OTHER PUBLICATIONS

Chinese Office Action for corresponding Chinese Patent Application No. 201380063769.1 dated Sep. 5, 2016 and partial English translation thereof.

(Continued)

*Primary Examiner* — David M Fenstermacher
(74) *Attorney, Agent, or Firm* — Roberts Mlotkowski Safran Cole & Calderon P.C.

(57) ABSTRACT

In a shift device, a "D" switch, an "N" switch, and an "R" switch are respectively installed to a right installation face, a front installation face, and a rear installation face of an installation body. The "D" switch, the "N" switch, and the "R" switch are separated from each other. This thereby enables easy identification of the positions of the "D" switch, the "N" switch, and the "R" switch, and enables simultaneous press-operation of two out of the "D" switch, the "N" switch, and the "R" switch to be suppressed, thereby enabling incorrect operation of the "D" switch, the "N" switch, and the "R" switch to be suppressed.

12 Claims, 7 Drawing Sheets

(51) Int. Cl.
*B60K 20/02* (2006.01)
*G05G 1/02* (2006.01)
*F16H 59/08* (2006.01)

(56) References Cited

U.S. PATENT DOCUMENTS

| | | | | |
|---|---|---|---|---|
| 6,246,127 | B1* | 6/2001 | Weilbacher | B60K 20/06 307/9.1 |
| 6,564,661 | B2* | 5/2003 | DeJonge | B60K 37/06 74/335 |
| 8,276,476 | B2* | 10/2012 | Diccion | E02F 9/2004 180/315 |
| 9,021,911 | B2* | 5/2015 | Kim | F16H 59/105 74/473.12 |
| 9,140,353 | B2* | 9/2015 | Meyer | B60K 37/06 |
| 9,200,707 | B2* | 12/2015 | Spaulding | F16H 63/483 |
| 9,599,216 | B2* | 3/2017 | Bialas | F16H 59/12 |
| 9,683,655 | B2* | 6/2017 | Ishino | F16H 59/12 |
| 2002/0152827 | A1 | 10/2002 | Hayashi et al. | |
| 2012/0001747 | A1 | 1/2012 | Klatt et al. | |
| 2015/0176699 | A1 | 6/2015 | Ishino | |

FOREIGN PATENT DOCUMENTS

| | | |
|---|---|---|
| DE | 102007029594 | 1/2009 |
| DE | 102010060577 A1 | 5/2012 |
| EP | 0250333 A1 | 12/1987 |
| EP | 1167831 | 1/2002 |
| JP | 54-180529 | 6/1979 |
| JP | S6320232 A | 1/1988 |
| JP | 2000-025478 | 1/2000 |
| JP | 2002-254950 | 9/2002 |
| JP | 2003-341376 | 12/2003 |
| JP | 2013-159270 A | 8/2013 |

OTHER PUBLICATIONS

Office Action issued in the corresponding JP application No. 2012-268702 dated Apr. 4, 2017.
Extended European Search Report issued in the corresponding EP application No. 13861052.2 dated Nov. 2, 2016.
International Search Report PCT/JP2013/078627 dated Dec. 12, 2013.
Japanese Application 2012-268702 Office Action dated Sep. 27, 2016 and english translation of notice of reasons for rejection.

* cited by examiner

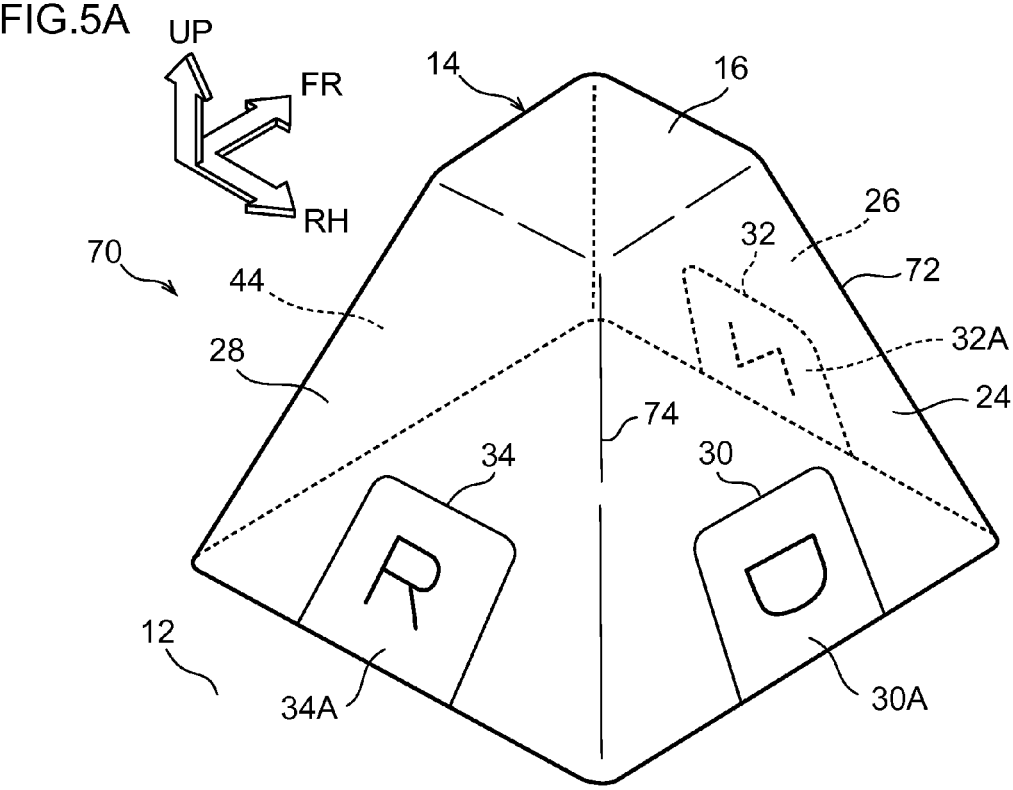
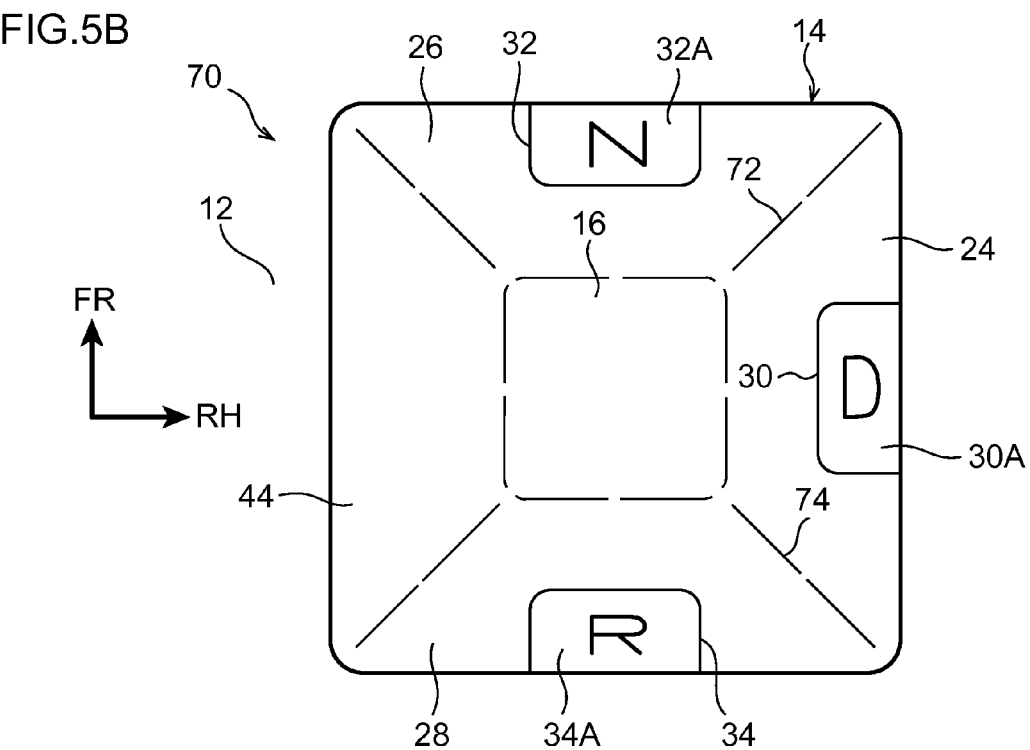

SHIFT DEVICE

TECHNICAL FIELD

The present invention relates to a shift device in which switches are operated to change a shift range of a transmission.

BACKGROUND ART

A shift device described in European Patent Application Laid-Open No. 1167831 is provided with plural buttons, and the buttons are operated to change the shift range of an automatic vehicle transmission.

In this shift device, the plural buttons are installed in the same plane as each other, and the plural buttons are configured with different shapes to each other in order to suppress incorrect operation of the buttons.

SUMMARY OF INVENTION

Technical Problem

In consideration of the above circumstances, an object of the present invention is to obtain a shift device capable of suppressing incorrect operation of switches.

Solution to Problem

A shift device of a first aspect of the present invention includes: a plurality of switches that are operated to change a shift range of a transmission; and an installation body that is provided with a plurality of installation faces on which the switches are respectively installed, and that is provided with a connection portion that connects the installation faces to each other and separates the switches from each other.

In the shift device of the first aspect of the present invention, the switches are operated to change the shift range of the transmission.

The installation body is provided with the plural installation faces and the connection portion, and the connection portion connects the installation faces to each other. The switches are respectively installed on the plural installation faces, and the connection portion separates the switches from each other. This thereby enables easy identification of the positions of the plural switches by discerning the plural installation faces and the connection portion, and the connection portion enables simultaneous operation of the plural switches to be suppressed, thereby enabling incorrect operation of the switches to be suppressed.

A shift device of a second aspect of the present invention includes: a plurality of switches that are operated to change a shift range of a transmission; and an installation body that is provided with a specific number of installation faces on which the plurality of switches are installed such that the plurality of switches have different operation directions to each other, and that is provided with a separation portion that separates the switches from each other.

In the shift device of the second aspect of the present invention, the switches are operated to change the shift range of the transmission.

The installation body is provided with the specific number of installation faces and the separation portion. The plural switches are installed to the specific number of installation faces such that the plural switches have different operation directions to each other, and the separation portion separates the switches from each other. This thereby enables easy identification of the positions of the plural switches by discerning the operation directions of the plural switches, and the separation portion enables simultaneous operation of the plural switches to be suppressed, thereby enabling incorrect operation of the switches to be suppressed.

A shift device of a third aspect of the present invention includes: a plurality of switches that are operated to change a shift range of a transmission; and an installation body that is provided with an installation face with a curved face profile, on which the plurality of switches are installed, and that is provided with a separation portion that separates the switches from each other.

In the shift device of the third aspect of the present invention, the switches are operated to change the shift range of the transmission.

The installation body is provided with the installation face and the separation portion, the plural switches are installed to the installation face with a curved face profile, and the separation portion separates the switches from each other. This thereby enables easy identification of the positions of the plural switches by discerning the curved face of the installation face, and the separation portion enables simultaneous operation of the plural switches to be suppressed, thereby enabling incorrect operation of the switches to be suppressed.

A shift device of a fourth aspect of the present invention is the shift device of the first aspect or the second aspect of the present invention, wherein the installation face has a curved face profile.

In the shift device of the fourth aspect of the present invention, the installation face has a curved face profile. This thereby enables easy operation of the switches due to the curved face of the installation face guiding the finger toward a side of the switch.

A shift device of a fifth aspect of the present invention is the shift device of any one of the first aspect to the fourth aspect of the present invention, wherein the installation body projects outward, and the switch is operated toward a side orthogonal to a projection direction of the installation body.

In the shift device of the fifth aspect of the present invention, the installation body projects outward, and the switch is operated toward the side orthogonal to the projection direction of the installation body. When a hand approaches the installation body from the projection direction side of the installation body, any force exerted by the hand toward the side orthogonal to the projection direction of the installation body is small, thereby enabling incorrect operation of the switch to be suppressed.

A shift device of a sixth aspect of the present invention is the shift device of any one of the first aspect to the fifth aspect of the present invention, wherein the installation body projects outward, and the plurality of switches are disposed around a projection-peripheral direction of the installation body.

In the shift device of the sixth aspect of the present invention, the installation body projects outward, and the plural switches are disposed around a projection-peripheral direction of the installation body. It is accordingly necessary to turn the entire hand, or a specific finger, about the projection-peripheral direction of the installation body in order to operate the plural switches with the specific finger, thereby enabling incorrect operation of the switches to be suppressed.

A shift device of a seventh aspect of the present invention is the shift device of any one of the first aspect to the sixth aspect of the present invention, wherein a plurality of connection faces, which are provided at the installation body between the installation faces, connect the installation faces to each other.

In the shift device of the seventh aspect of the present invention, the plural connection faces, which are provided at the installation body between the installation faces, connect the installation faces to each other. This thereby enables identification of the positions of the plural switches to be made even easier by discerning the plural connection faces, thereby enabling incorrect operation of the switches to be further suppressed.

A shift device of an eighth aspect of the present invention is the shift device of any one of the first aspect to the seventh aspect of the present invention, the plurality of switches do not oppose each other across the installation body.

In the shift device of the eighth aspect of the present invention, the plural switches do not oppose each other across the installation body. In a state in which the installation body is gripped between the fingers in order to operate one of the switches, operation of another switch can be suppressed, enabling incorrect operation of the switches to be suppressed.

A shift device of a ninth aspect of the present invention is the shift device of any one of the first aspect to the eighth aspect of the present invention, wherein a protruding or recessed peripheral portion is provided at a periphery of the installation body.

In the shift device of the ninth aspect of the present invention, the protruding or recessed peripheral portion is provided at the periphery of the installation body. This thereby enables the position of the installation body to be identified by discerning the peripheral portion when the hand approaches the installation body. This thereby enables the hand to be suppressed from touching the installation body in a state in which the position of the installation body has not been identified, thereby enabling incorrect operation of the switches to be suppressed.

A shift device of a tenth aspect of the present invention is the shift device of any one of the first aspect to the ninth aspect of the present invention, wherein the switch is installed at a periphery of the installation body.

In the shift device of the tenth aspect of the present invention, the switch is installed at the periphery of the installation body. This makes it easy to distinguish between a switch on the installation body and a switch at the periphery of the installation body by discerning the installation body, thereby enabling improved ease of operation of the plural switches.

BRIEF DESCRIPTION OF DRAWINGS

FIG. 5A is a perspective view illustrating a shift device according to a fourth exemplary embodiment of the present invention, as viewed diagonally from the rear right of a vehicle.

FIG. 5B is a plan view illustrating the shift device according to the fourth exemplary embodiment of the present invention, as viewed from above.

DESCRIPTION OF EMBODIMENTS

First Exemplary Embodiment

Figure 1:
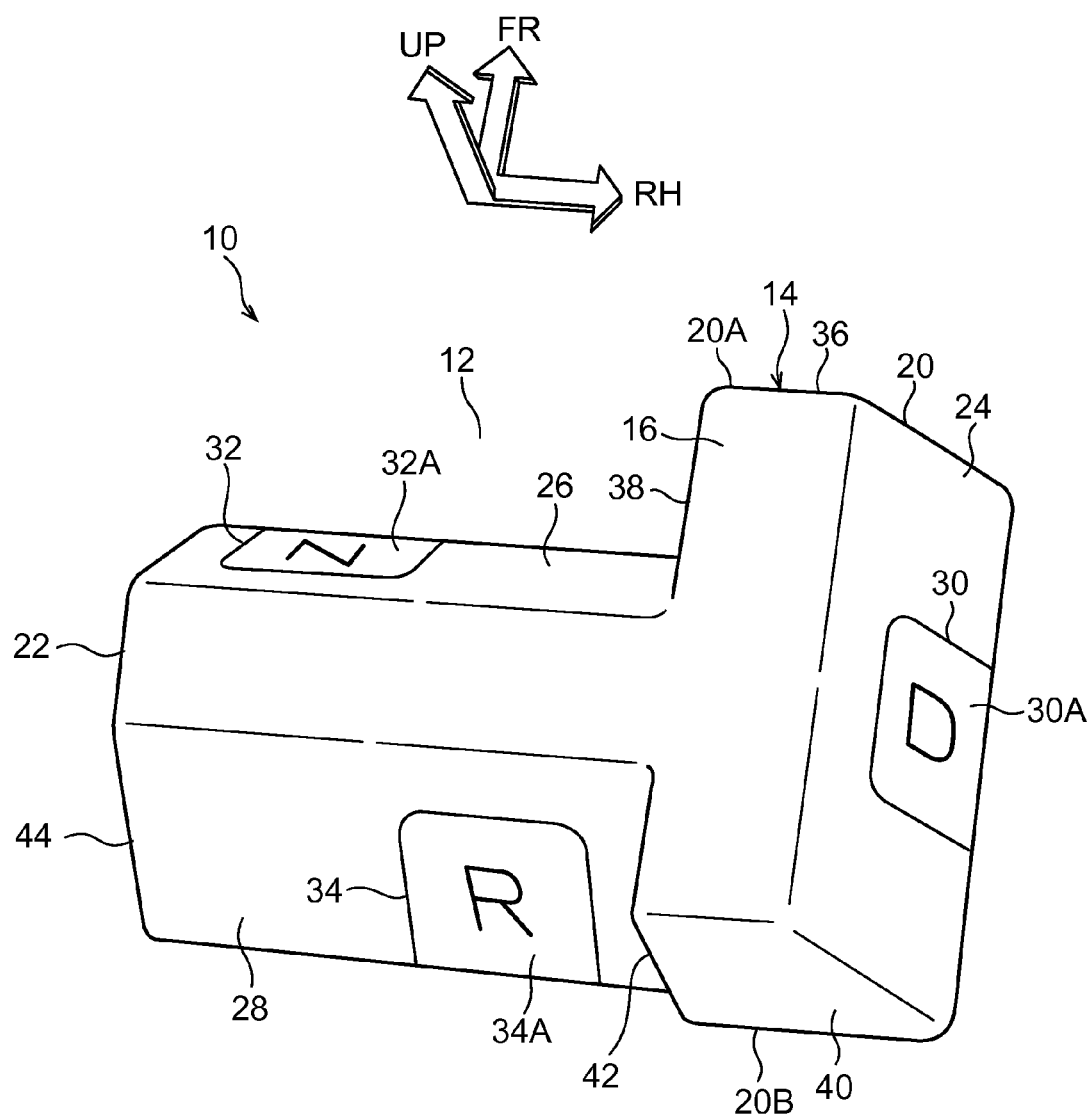
FIG. 1 is a perspective view illustrating a shift device according to a first exemplary embodiment of the present invention, as viewed diagonally from the rear right of a vehicle.
Figure 2:
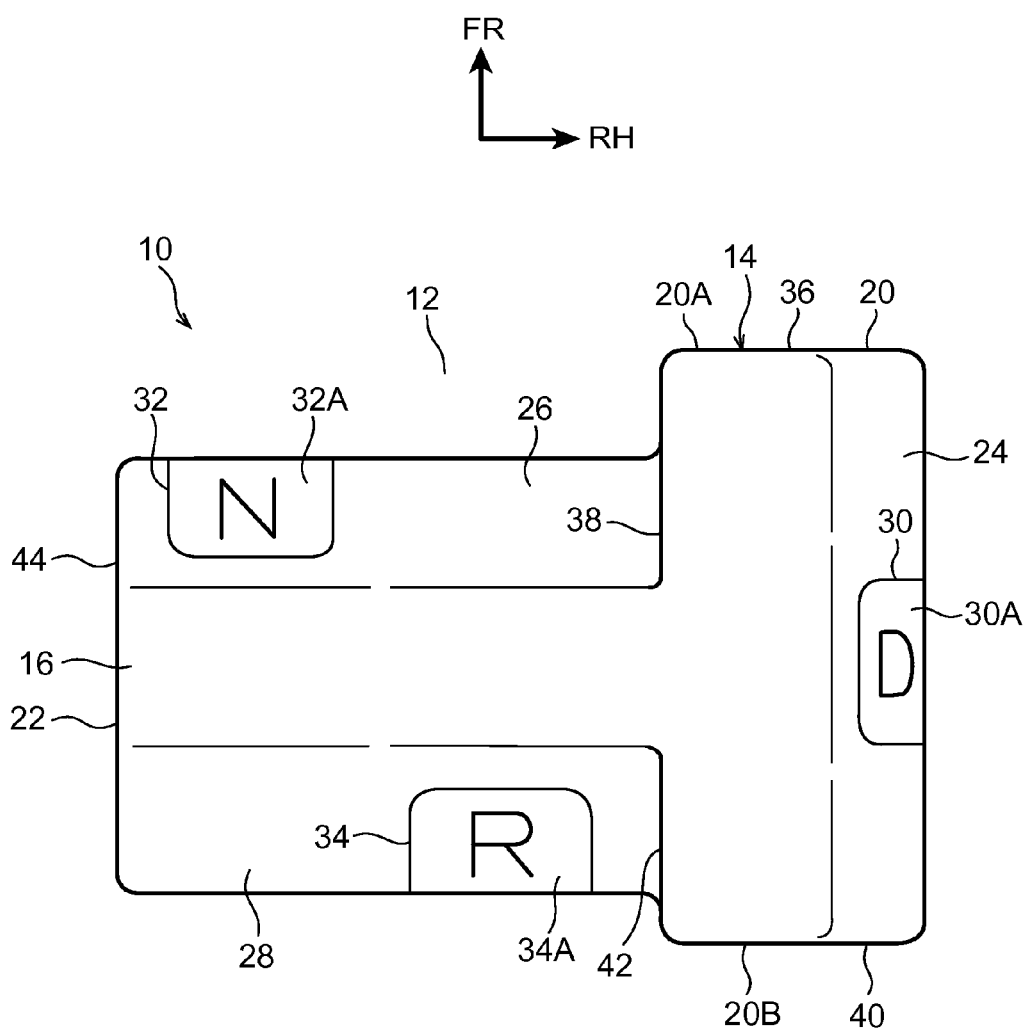
FIG. 2 is a plan view illustrating the shift device according to the first exemplary embodiment of the present invention, as viewed from above.

FIG. 1 is a perspective view illustrating a shift device 10 according to a first exemplary embodiment of the present invention, as viewed diagonally from the rear right of a vehicle. FIG. 2 is a plan view illustrating the shift device 10 as viewed from above. Note that in the drawings, the arrow FR indicates the vehicle front, the arrow RH indicates the right of the vehicle, and the arrow UP indicates upwards.

The shift device 10 according to the present exemplary embodiment is applied to a right-hand drive vehicle. The steering wheel and the driving seat are disposed on the right side of the vehicle compartment of the vehicle.

As illustrated in FIG. 1 and FIG. 2, a disposition face 12 is provided at an upper face (front face) of a floor section (for example a center console) of the vehicle compartment, to the vehicle left side (vehicle left-right direction inside) of the driving seat. The disposition face 12 is disposed orthogonally to the up-down direction.

The shift device 10 includes an installation body 14 with a horizontal T-shaped block profile in plan view. The installation body 14 is disposed (fixed) on the disposition face 12, and projects out upward from the disposition face 12. An upper face (projection end face) of the installation body 14 configures a placement face 16 with a horizontal T-shaped flat plane profile. The placement face 16 is disposed orthogonally to the up-down direction, and the palm 18A of the left hand 18 (hand) of the driver (occupant) illustrated in FIG. 6 can be placed on the placement face 16.

A vehicle right side (driving seat side) portion of the installation body 14 configures a substantially cuboid shaped first installation portion 20. The first installation portion 20 is elongated in the vehicle front-rear direction. A portion on the vehicle left side (the opposite side to the driving seat) of the installation body 14 configures a substantially cuboid shaped second installation portion 22. The second installation portion 22 is elongated in the vehicle left-right direction. The second installation portion 22 extends from a vehicle front-rear direction intermediate portion of the first installation portion 20 toward the left of the vehicle. A portion of the first installation portion 20 to the vehicle front side of the second installation portion 22 configures a front extension portion 20A serving as a first extension portion, and a portion of the first installation portion 20 to the vehicle rear side of the second installation portion 22 configures a rear extension portion 20B serving as a second extension portion. The extension amount of the rear extension portion 20B from the second installation portion 22 toward the vehicle rear side is set smaller than the extension amount of the front extension portion 20A from the second installation portion 22 toward the vehicle front side.

A vehicle right side face of the first installation portion 20 (a vehicle right side face of the installation body 14) configures a rectangular, flat plane shaped right installation face 24 serving as an installation face (first installation face). The driver is able to, for example, place the thumb 18B (finger) on the right side of the palm 18A of their left hand 18 on the right installation face 24. The right installation face 24 is inclined in a direction toward the upper side on progression toward the vehicle left side, and the inclination angle of the right installation face 24 with respect to the upward direction is set at 45° or less.

A vehicle front side face of the second installation portion 22 configures a rectangular, flat plane shaped front installation face 26 serving as an installation face (second installation face). The driver is able to, for example, place a finger of the left hand 18 other than the thumb 18B (in particular the index finger 18C or the middle finger) on the front installation face 26. The front installation face 26 is inclined in a direction toward the upper side on progression toward the vehicle rear side, and the inclination angle of the front installation face 26 with respect to the upward direction is set at 45° or less.

A vehicle rear side face of the second installation portion 22 configures a rectangular, flat plane shaped rear installation face 28 serving as an installation face (third installation face). The driver is, for example, able to place the thumb 18B positioned at the lower side of the palm 18A of their left hand 18 on the rear installation face 28, with placement possible when the driver has turned the palm 18A of their left hand 18 toward the right side by approximately 90° to position the thumb 18B at the rear side. The rear installation face 28 is inclined in a direction toward the upper side on progression toward the vehicle front side, and the inclination angle of the rear installation face 28 with respect to the upward direction is set at 45° or less. As described above, the extension amount of the rear extension portion 20B from the second installation portion 22 toward the vehicle rear side is smaller than the extension amount of the front extension portion 20A from the second installation portion 22 toward the vehicle front side. The rear extension portion 20B is accordingly suppressed from obstructing movement of the thumb 18B of the driver's left hand 18 between the right installation face 24 and the rear installation face 28.

A "D" switch 30 (drive switch), serving as a switch, is installed at a lower side portion of a vehicle front-rear direction central portion of the right installation face 24. A front face of the "D" switch 30 configures a "D" operation face 30A, serving as an operation face. The "D" operation face 30A is configured with a rectangular flat plane shape, and the "D" operation face 30A is disposed in the same plane as the right installation face 24. The "D" operation face 30A of the "D" switch 30 can be press-operated, and the press-operation direction of the "D" switch 30 ("D" operation face 30A) is a diagonal downward direction toward the left of the vehicle (toward the vehicle left side and a horizontal direction side), with an inclination angle with respect to the horizontal plane set at 45° or less. The "D" switch 30 ("D" operation face 30A) is, for example, press operable by the thumb 18B positioned on the right side of the palm 18A of the driver's left hand 18.

An "N" switch 32 (neutral switch), serving as a switch, is installed at a lower side portion of a vehicle left side portion of the front installation face 26. A front face of the "N" switch 32 configures an "N" operation face 32A, serving as an operation face. The "N" operation face 32A is configured with a rectangular flat plane shape, and the "N" operation face 32A is disposed in the same plane as the front installation face 26. The "N" operation face 32A of the "N" switch 32 can be press-operated, and the press-operation direction of the "N" switch 32 ("N" operation face 32A) is a diagonal downward direction toward the vehicle rear (toward the vehicle rear side and the horizontal direction side), with an inclination angle with respect to the horizontal plane set at 45° or less. The "N" switch 32 ("N" operation face 32A) is, for example, press operable by a finger of the driver's left hand 18 other than the thumb 18B (in particular the index finger 18C or the middle finger).

An "R" switch 34 (reverse switch), serving as a switch, is installed at a lower side portion of a vehicle right side portion of the rear installation face 28. A front face of the "R" switch 34 configures an "R" operation face 34A, serving as an operation face. The "R" operation face 34A is configured with a rectangular flat plane shape, and the "R" operation face 34A is disposed in the same plane as the rear installation face 28. The "R" operation face 34A of the "R" switch 34 can be press-operated, and the press-operation direction of the "R" switch 34 ("R" operation face 34A) is a diagonal downward direction toward the vehicle front (toward the vehicle front side and the horizontal direction side), with an inclination angle with respect to the horizontal plane set at 45° or less. The "R" switch 34 ("R" operation face 34A) is, for example, press operable by the thumb 18B positioned at the lower side of the palm 18A of the driver's left hand 18, and is press operable by the thumb 18B when the driver has turned the palm 18A of their left hand 18 toward the right side by approximately 90° to position the thumb 18B at the rear side.

The "N" switch 32 ("N" operation face 32A) and the "R" switch 34 ("R" operation face 34A) do not oppose each other in the vehicle front-rear direction across the second installation portion 22 A vehicle right side end of the "N" switch 32 ("N" operation face 32A) is disposed on the vehicle left side of a vehicle left side end of the "R" switch 34 ("R" operation face 34A).

The "D" switch 30, the "N" switch 32, and the "R" switch 34 are electrically connected to an automatic transmission (not illustrated in the drawings) of the vehicle. Press-operation of the "D" switch 30, the "N" switch 32, and the "R" switch 34 respectively places a shift range of the automatic transmission in a "D" range (drive range), an "N" range (neutral range), and an "R" range (reverse range). When the shift range of the automatic transmission is placed in the "D" range, forward drive force is transmitted to the vehicle wheels. When the shift range of the automatic transmission is placed in the "N" range, transmission of drive force to the vehicle wheels is cut off. When the shift range of the automatic transmission is placed in the "R" range, reverse drive force is transmitted to the vehicle wheels.

A vehicle front side face of the first installation portion 20 (front extension portion 20A) configures a trapezoidal, flat plane shaped front connection face 36 serving as a connection face that configures a connection portion (first connection portion) and a separation portion (first separation portion). The front connection face 36 is disposed orthogonally to the vehicle front-rear direction.

A vehicle left side face of the front extension portion 20A configures a trapezoidal, flat plane shaped front side connection face 38 serving as a connection face that configures a connection portion (first connection portion) and a separation portion (first separation portion). The front side connection face 38 is disposed orthogonally to the vehicle left-right direction.

A vehicle rear side face of the first installation portion 20 (rear extension portion 20B) configures a trapezoidal, flat plane shaped rear connection face 40 serving as a connection face that configures a connection portion (second connection portion) and a separation portion (second separation portion). The rear connection face 40 is disposed orthogonally to the vehicle front-rear direction.

A vehicle left side face of the rear extension portion 20B configures a trapezoidal, flat plane shaped rear side connection face 42 serving as a connection face that configures a connection portion (second connection portion) and a separation portion (second separation portion). The rear side connection face 42 is disposed orthogonally to the vehicle left-right direction.

A vehicle left side face of the second installation portion 22 (a vehicle left side face of the installation body 14) configures a trapezoidal, flat plane shaped left connection face 44 serving as a connection portion (third connection portion) that configures a separation portion (third separation portion), and as a connection face. The left connection face 44 is disposed orthogonally to the vehicle left-right direction.

Next, explanation follows regarding operation of the present exemplary embodiment. In the shift device 10 configured as described above, the "D" switch 30, the "N" switch 32, and the "R" switch 34 are respectively press-operated to change the shift range of the automatic transmission to the "D" range, the "N" range, and the "R" range.

Note that in the installation body 14, the right installation face 24, the front installation face 26, and the rear installation face 28 are respectively installed with the "D" switch 30, the "N" switch 32, and the "R" switch 34. Moreover, the right installation face 24 and the front installation face 26 are connected to each other through the front connection face 36 and the front side connection face 38, the right installation face 24 and the rear installation face 28 are connected to each other through the rear connection face 40 and the rear side connection face 42, and the front installation face 26 and the rear installation face 28 are connected to each other through the left connection face 44.

The driver can accordingly easily identify the positions of the "D" switch 30, the "N" switch 32, and the "R" switch 34 by discerning the right installation face 24, the front installation face 26, the rear installation face 28, the front connection face 36, the front side connection face 38, the rear connection face 40, the rear side connection face 42, and the left connection face 44 with their left hand 18 (and the fingers thereof), without looking at the installation body 14.

The respective press-operation directions of the "D" switch 30, the "N" switch 32, and the "R" switch 34 are different to each other, namely are respectively toward the vehicle left side, the vehicle rear side, and the vehicle front side.

The driver can accordingly easily identify the positions of the "D" switch 30, the "N" switch 32, and the "R" switch 34 by discerning the respective press-operation directions of the "D" switch 30, the "N" switch 32, and the "R" switch 34 with their left hand 18 (and the fingers thereof), without looking at the installation body 14.

The "D" switch 30 and the "N" switch 32 are separated from each other by a portion of the right installation face 24 further to the vehicle front side than the "D" switch 30, the front connection face 36, the front side connection face 38, and a portion of the front installation face 26 further to the vehicle right side than the "N" switch 32. The "D" switch 30 and the "R" switch 34 are separated from each other by a portion of the right installation face 24 further to the vehicle rear side than the "D" switch 30, the rear connection face 40, the rear side connection face 42, and a portion of the rear installation face 28 further to the vehicle right side than the "R" switch 34. The "N" switch 32 and the "R" switch 34 are separated from each other by a portion of the front installation face 26 further to the vehicle left side than the "N" switch 32, the left connection face 44, and a portion of the rear installation face 28 further to the vehicle left side than the "R" switch 34.

Simultaneous press-operation of two out of the "D" switch 30, the "N" switch 32, and the "R" switch 34 by the driver can accordingly be suppressed, without the driver looking at the installation body 14.

The above configuration enables incorrect operation of the "D" switch 30, the "N" switch 32, and the "R" switch 34 to be suppressed, enables the driver to operate the "D" switch 30, the "N" switch 32, and the "R" switch 34 easily, without looking at the installation body 14. This thereby enables any hindrance to the driver driving the vehicle resulting from operation of the "D" switch 30, the "N" switch 32, and the "R" switch 34 to be suppressed.

As described above, the right installation face 24 and the front installation face 26 are connected to each other through plural connection faces (the front connection face 36 and the front side connection face 38), and the right installation face 24 and the rear installation face 28 are connected to each other through plural connection faces (the rear connection face 40 and the rear side connection face 42). This further facilitates identification of the positions of the "D" switch 30, the "N" switch 32, and the "R" switch 34 by the driver discerning the plural connection faces with their left hand 18 (and the fingers thereof), without looking at the installation body 14. This thereby enables incorrect operation of the "D" switch 30, the "N" switch 32, and the "R" switch 34 to be further suppressed.

The press-operation directions of the "D" switch 30, the "N" switch 32, and the "R" switch 34 are set toward the horizontal direction side (at an inclination angle of 45° or less with respect to the horizontal plane). Incorrect operation of the "D" switch 30, the "N" switch 32, and the "R" switch 34 can accordingly be suppressed, since when the driver moves their left hand 18 toward the installation body 14 from the upper side (the projection direction side of the installation body 14) without looking at the installation body 14, the left hand 18 applies force most readily toward the lower side (the opposite side to the projection direction of the installation body 14), and the left hand 18 applies little force toward the horizontal direction side (a side orthogonal to the projection direction of the installation body 14).

Moreover, the "D" switch 30, the "N" switch 32, and the "R" switch 34 are respectively disposed on the right installation face 24, the front installation face 26, and the rear installation face 28, in a row around a projection-peripheral direction of the installation body 14. When press-operating the "D" switch 30, the "N" switch 32, and the "R" switch 34 with a specific finger of the driver's left hand 18 (for example the thumb 18B, the index finger 18C, or the middle finger), it is therefore necessary to turn the whole left hand 18, or the specific finger, in the projection-peripheral direction of the installation body 14. This thereby enables incorrect operation of the "D" switch 30, the "N" switch 32, or the "R" switch 34 to be suppressed. Moreover, simultaneous press-operation of two or more out of the "D" switch 30, the "N" switch 32, and the "R" switch 34 can be suppressed, enabling incorrect operation of the "D" switch 30, the "N" switch 32, and the "R" switch 34 to be further suppressed.

In particular, when the driver press-operates the "D" switch 30 and the "R" switch 34 with the thumb 18B of their left hand 18, it is necessary to turn either the entire left hand 18, or the thumb 18B, in the projection-peripheral direction of the installation body 14. This thereby enables incorrect operation of the "D" switch 30 and the "R" switch 34, of which incorrect operation could cause the vehicle to move, to be suppressed. Moreover, simultaneous press-operation of the "D" switch 30 and the "R" switch 34 can be suppressed, enabling incorrect operation of the "D" switch 30 and the "R" switch 34 to be further suppressed.

The "N" switch 32 and the "R" switch 34 are at different positions in the vehicle left-right direction, and therefore do not oppose each other across the second installation portion 22 of the installation body 14. In a state in which the driver grips the second installation portion 22 between the thumb 18B and a finger other than the thumb 18B (for example the index finger 18C or the middle finger) to operate either the "N" switch 32 or the "R" switch 34 with the finger other than the thumb 18B or the thumb 18B, operation of the other out of the "N" switch 32 and the "R" switch 34 by the other out of the finger other than the thumb 18B or the thumb 18B can be suppressed, thereby enabling incorrect operation of the "N" switch 32 and the "R" switch 34 to be suppressed.

Second Exemplary Embodiment

Figure 3:
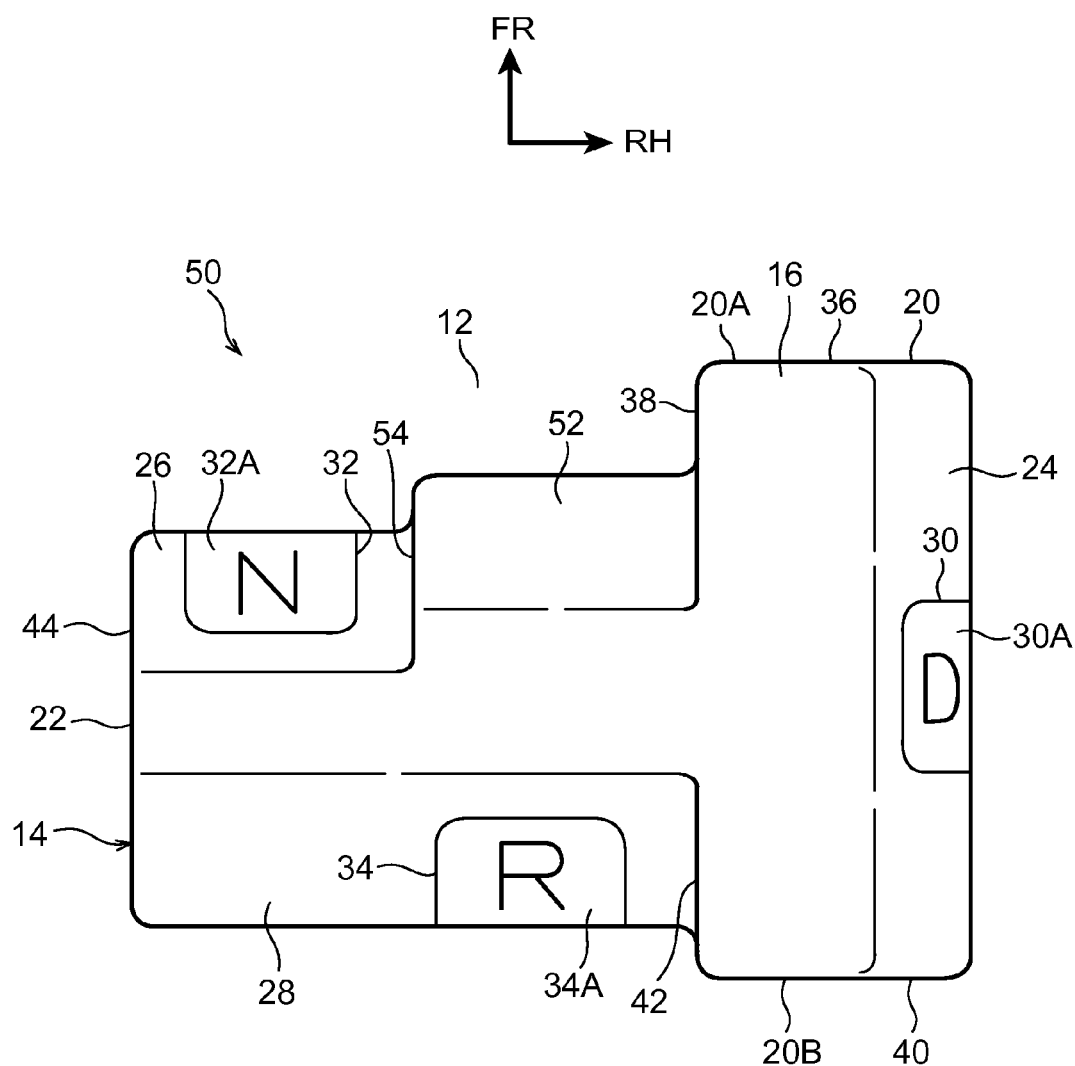
FIG. 3 is a plan view illustrating a shift device according to a second exemplary embodiment of the present invention, as viewed from above.

FIG. 3 is a plan view illustrating a shift device 50 according to a second exemplary embodiment of the present invention, as viewed from above.

The shift device 50 according to the present exemplary embodiment has substantially the same configuration as the shift device 10 described above; however differs in the following respects.

As illustrated in FIG. 3, in the shift device 50 according to the present exemplary embodiment, a vehicle front side face of the second installation portion 22 of an installation body 14 is configured with the front installation face 26 at a vehicle left side portion only.

A vehicle right side portion of the vehicle front side face of the second installation portion 22 configures a rectangular, flat plane shaped intermediate connection face 52 serving as a connection face that configures a connection portion (first connection portion) and a separation portion (first separation portion). The intermediate connection face 52 is disposed parallel to the front installation face 26, and is disposed further to the vehicle front side than the front installation face 26.

A flat plane shaped step connection face 54 with a parallelogram shape, serving as a connection face that configures a connection portion (first connection portion) and a separation portion (first separation portion), is configured between the front installation face 26 and the intermediate connection face 52. The step connection face 54 is disposed orthogonally to the vehicle left-right direction.

Note that the present exemplary embodiment enables similar operation and advantageous effects to those of the first exemplary embodiment.

In particular, the right installation face 24 and the front installation face 26 are connected to each other through the front connection face 36, the front side connection face 38, the intermediate connection face 52, and the step connection face 54. This further facilitates identification of the positions of the "D" switch 30 and the "N" switch 32 by the driver discerning the right installation face 24, the front installation face 26, the front connection face 36, the front side connection face 38, the intermediate connection face 52, and the step connection face 54 with their left hand 18 (and the fingers thereof), without looking at the installation body 14. This thereby enables incorrect operation of the "D" switch 30 and the "N" switch 32 to be further suppressed.

Note that in the present exemplary embodiment, in addition to the front installation face 26, the vehicle front side face of the second installation portion 22 of the installation body 14 is also provided with the intermediate connection face 52 and the step connection face 54. However, an intermediate connection face 52 and a step connection face 54 may also be provided on the vehicle rear side face of the second installation portion 22 of the installation body 14 in addition to the rear installation face 28, or an intermediate connection face 52 and a step connection face 54 may be provided on the vehicle right side face of the first installation portion 20 of the installation body 14 in addition to the right installation face 24.

In the present exemplary embodiment, the front installation face 26 and the intermediate connection face 52 are provided at different placement positions due to the step connection face 54. However, the front installation face 26 and the intermediate connection face 52 may be provided at different placement angles.

In the first exemplary embodiment and the second exemplary embodiment, the first installation portion 20 of the installation body 14 is provided with the front extension portion 20A and the rear extension portion 20B. However, the first installation portion 20 of the installation body 14 may be provided with only one out of the front extension portion 20A and the rear extension portion 20B.

Third Exemplary Embodiment

Figure 4:
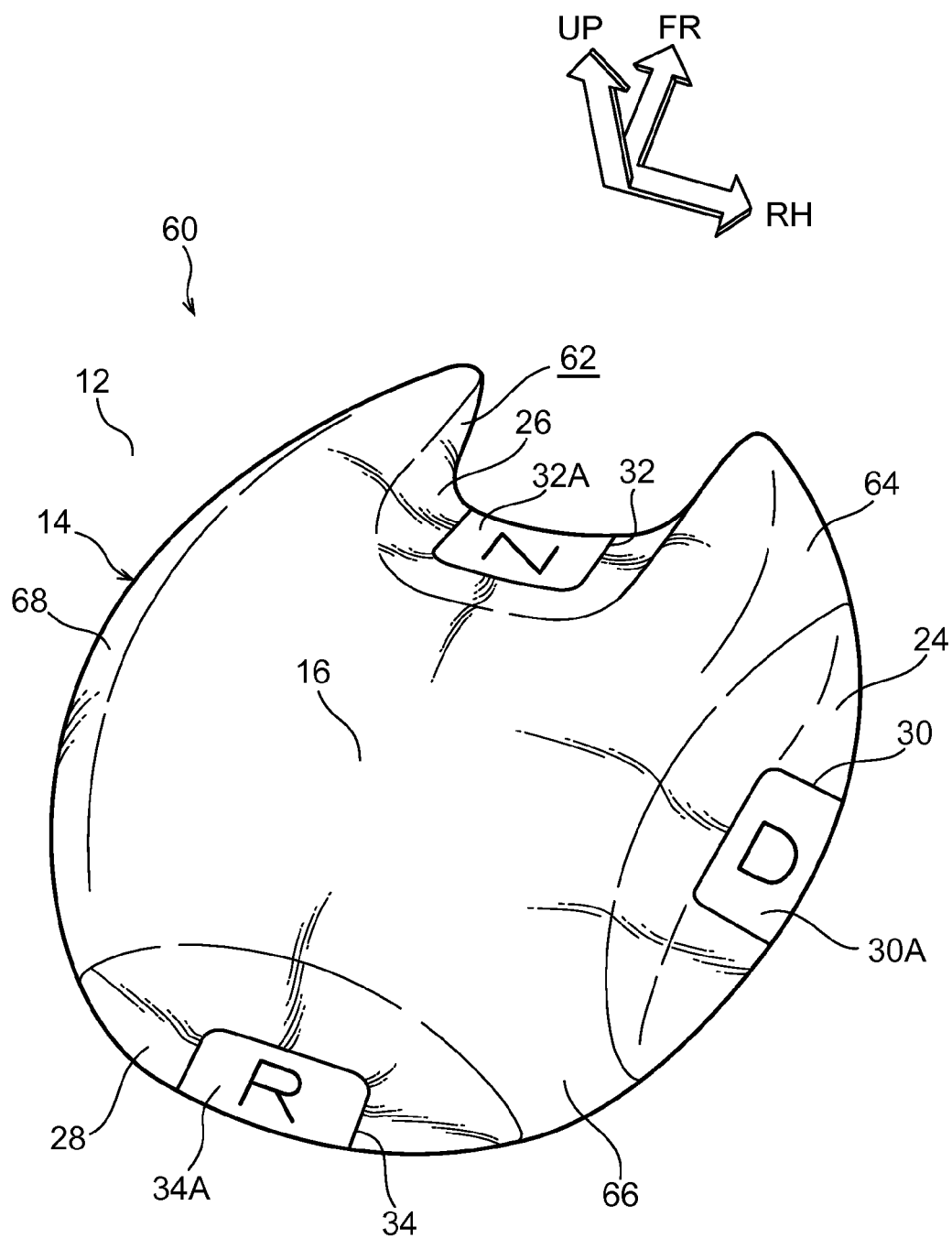
FIG. 4 is a perspective view illustrating a shift device according to a third exemplary embodiment of the present invention, as viewed diagonally from the rear right of a vehicle.

FIG. 4 is a perspective view illustrating a shift device 60 according to a third exemplary embodiment of the present invention, as viewed diagonally from the rear right of the vehicle.

The shift device 60 according to the present exemplary embodiment has substantially the same configuration as the first exemplary embodiment; however differs in the following respects.

As illustrated in FIG. 4, in the shift device 60 according to the present exemplary embodiment, an installation body 14 is configured in a substantially semispherical shape, and a front face of the installation body 14 is configured with a substantially spherical surface. An upper side portion of the front face of the installation body 14 configures a placement face 16, and the placement face 16 is curved in a protruding shape.

An installation recess 62 that is rectangular shaped in plan view is formed at a vehicle front side portion of the installation body 14. The inside of the installation recess 62 is open toward the vehicle front side and the upper side.

A vehicle right side face of the installation body 14 configures a right installation face 24 that is substantially elliptical shaped in plan view. The right installation face 24 is elongated in the vehicle front-rear direction. The right installation face 24 is inclined in a direction toward the upper side on progression toward the vehicle left side, and the right installation face 24 curve in a recessed shape along the vehicle left-right direction.

A peripheral face of the installation recess 62 of the installation body 14 configures a front installation face 26 that is U-shaped in plan view. A boundary between a vehicle rear side face and a vehicle right side face of the front installation face 26, and a boundary between the vehicle rear side face and a vehicle left side face of the front installation face 26, curve in a recessed shape along the vehicle left-right direction. The vehicle rear side face of the front installation face 26 is inclined in a direction toward the upper side on progression toward the vehicle rear side, and the vehicle rear side face of the front installation face 26 curves in a recessed shape along the vehicle front-rear direction.

A side face on the vehicle rear side of the installation body 14 configures a rear installation face 28 that is substantially elliptical shaped in plan view. The rear installation face 28 is elongated in the vehicle left-right direction. The rear installation face 28 is inclined in a direction toward the upper side on progression toward the vehicle front side, and the rear installation face 28 curves in a recessed shape along the vehicle front-rear direction.

A "D" switch 30 is installed at a lower side portion of a vehicle front-rear direction central portion of the right installation face 24, and a "D" operation face 30A of the "D" switch 30 is disposed in the same plane as the right installation face 24. The press-operation direction of the "D" switch 30 ("D" operation face 30A) is a diagonal downward direction toward the left of the vehicle, with the inclination angle set to 45° or less with respect to the downward direction.

An "N" switch 32 is installed at a lower side portion of a vehicle left-right direction central portion of the vehicle rear side face of the front installation face 26, and a "N" operation face 32A of the "N" switch 32 is disposed in the same plane as the front installation face 26. The press-operation direction of the "N" switch 32 ("N" operation face 32A) is a diagonal downward direction toward the rear of the vehicle, with the inclination angle set to 45° or less with respect to the downward direction.

An "R" switch 34 is installed at a lower side portion of a vehicle left-right direction central portion of the rear installation face 28, and an "R" operation face 34A of the "R" switch 34 is disposed in the same plane as the rear installation face 28. The press-operation direction of the "R" switch 34 ("R" operation face 34A) is a diagonal downward direction toward the front of the vehicle, with the inclination angle set to 45° or less with respect to the downward direction.

The front face of the installation body 14 at a vehicle front diagonal right side configures a front connection face 64 serving as a connection portion (first connection portion) that configures a separation portion (first separation portion), and as a connection face. The front connection face 64 is curved in a protruding shape.

The front face of the installation body 14 at a vehicle rear diagonal right side configures a rear connection face 66 serving as a connection portion (second connection portion) that configures a separation portion (second separation portion), and as a connection face. The rear connection face 66 is curved in a protruding shape.

The front face of the installation body 14 at a vehicle left side of the installation body 14 configures a left connection face 68 serving as a connection portion (third connection portion) that configures a separation portion (third separation portion), and as a connection face. The left connection face 68 is curved in a protruding shape.

Note that the present exemplary embodiment enables similar operation and advantageous effects to those of the first exemplary embodiment, with the exception of operation and advantageous effects due to the right installation face 24, the front installation face 26, and the rear installation face 28 being connected to each other through plural connection faces, operation and advantageous effects due to the press-operation directions of the "D" switch 30, the "N" switch 32, and the "R" switch 34 being set toward horizontal direction sides, and operation and advantageous effects due to the "N" switch 32 and the "R" switch 34 not opposing each other across the installation body 14.

Moreover, the right installation face 24, the front installation face 26, and the rear installation face 28 are each curved in a recessed shape. The fingers of the driver's left hand 18 are accordingly guided by the curved faces of the right installation face 24, the front installation face 26, and the rear installation face 28 to the respective sides of the "D" switch 30, the "N" switch 32, and the "R" switch 34, without the driver looking at the installation body 14. This thereby enables easy operation of the "D" switch 30, the "N" switch 32, and the "R" switch 34.

Note that in the present exemplary embodiment, the press-operation directions of the "D" switch 30, the "N" switch 32, and the "R" switch 34 are set toward vertical direction sides (the inclination angle is 45° or less with respect to the downward direction). However, the press-operation directions of the "D" switch 30, the "N" switch 32, and the "R" switch 34 may be set toward horizontal direction sides (the inclination angles may be 45° or less with respect to the horizontal plane).

Fourth Exemplary Embodiment

FIG. 5A is a perspective view illustrating a shift device 70 according to a fourth exemplary embodiment of the present invention, as viewed diagonally from the rear right of the vehicle. FIG. 5B is a plan view illustrating the shift device 70, as viewed from above.

The shift device 70 according to the present exemplary embodiment has substantially the same configuration as the first exemplary embodiment; however differs in the following respects.

As illustrated in FIG. 5A and FIG. 5B, in the shift device 70 according to the present exemplary embodiment, an installation body 14 is configured with a truncated square pyramid shape and an upper face (front face) of the installation body 14 configures a rectangular, flat plane shaped placement face 16.

A vehicle right side face, a vehicle front side face, and a vehicle rear side face of the installation body 14 respectively configure a right installation face 24, a front installation face 26, and a rear installation face 28, each of which has a trapezoidal, flat plane shape. A "D" switch 30, an "N" switch 32, and an "R" switch 34 are respectively installed at a vehicle front-rear direction central portion of a lower side portion of the right installation face 24, a vehicle left-right direction central portion of a lower side portion of the front installation face 26, and a vehicle left-right direction central portion of a lower side portion of the rear installation face 28.

A corner portion between the right installation face 24 and the front installation face 26 of the installation body 14 configures a front corner portion 72 serving as a connection portion (first connection portion) that configures a separation portion (first separation portion). The front corner portion 72 connects together the right installation face 24 and the front installation face 26.

A corner portion between the right installation face 24 and the rear installation face 28 of the installation body 14 configures a rear corner portion 74 serving as a connection portion (second connection portion) that configures a separation portion (second separation portion). The rear corner portion 74 connects together the right installation face 24 and the rear installation face 28.

A vehicle left side face of the installation body 14 configures a trapezoidal, flat plane shaped left connection face 44 serving as a connection face and a connection portion (third connection portion) that configures a separation portion (third separation portion). The left connection face 44 is inclined in a direction toward the upper side on progression toward the vehicle right side.

Note that the present exemplary embodiment enables similar operation and advantageous effects to those of the first exemplary embodiment described above, with the exception of operation and advantageous effects due to the right installation face 24, the front installation face 26, and the rear installation face 28 being connected to each other through plural connection faces, and operation and advantageous effects due to the "N" switch 32 and the "R" switch 34 not opposing each other across the installation body 14.

Fifth Exemplary Embodiment

Figure 6:
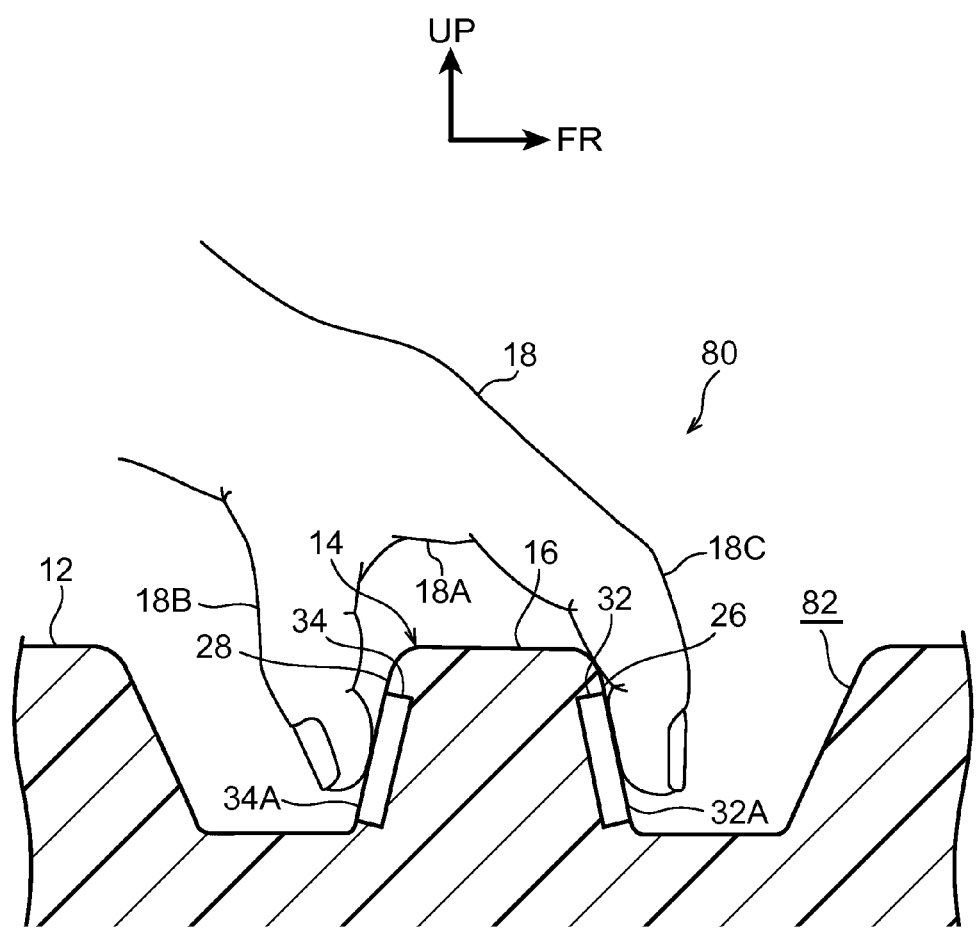
FIG. 6 is a cross-section illustrating a shift device according to a fifth exemplary embodiment of the present invention, as viewed from the right of a vehicle.

FIG. 6 is a cross-section illustrating a shift device 80 according to a fifth exemplary embodiment of the present invention, as viewed from the right of the vehicle.

The shift device 80 according to the present exemplary embodiment has substantially the same configuration as the fourth exemplary embodiment described above; however differs in the following respects.

As illustrated in FIG. 6, in the shift device 80 according to the present exemplary embodiment, a peripheral recess 82 serving as a peripheral portion is formed to an disposition face 12 of a floor section of the vehicle compartment. An installation body 14 installed (fixed) to a bottom face (lower face) of the peripheral recess 82 projects out upward from the bottom face of the peripheral recess 82. The peripheral recess 82 is disposed around the entire outer periphery of the installation body 14, and the entire outer periphery of the peripheral recess 82 is disposed so as to follow the outer periphery of the installation body 14, such that the driver is able insert the fingers of their left hand 18. A placement face 16 (upper face) of the installation body 14 is disposed in the same plane as the disposition face 12.

Note that the present exemplary embodiment enables similar operation and advantageous effects to those of the fourth exemplary embodiment described above.

Moreover, the peripheral recess 82 is disposed around the entire periphery of the installation body 14. When the driver moves their left hand 18 toward the installation body 14 in order to find the installation body 14 without looking, the driver can identify the position of the installation body 14 by discerning the peripheral recess 82 with their left hand 18 (and the fingers thereof). This thereby enables the driver to be suppressed from touching the installation body 14 with their left hand 18 in a state in which they are not aware of the position of the installation body 14, thereby enabling incorrect operation of the "D" switch 30, the "N" switch 32, and the "R" switch 34 to be suppressed.

The placement face 16 (upper face) of the installation body 14 is disposed in the same plane as the disposition face 12. This enables improved design of the vehicle compartment.

Note that in the present exemplary embodiment, the recessed peripheral portion (peripheral recess 82) is provided at the periphery of the installation body 14. However, a protruding peripheral portion may be provided at the periphery of the installation body 14.

Sixth Exemplary Embodiment

Figure 7:
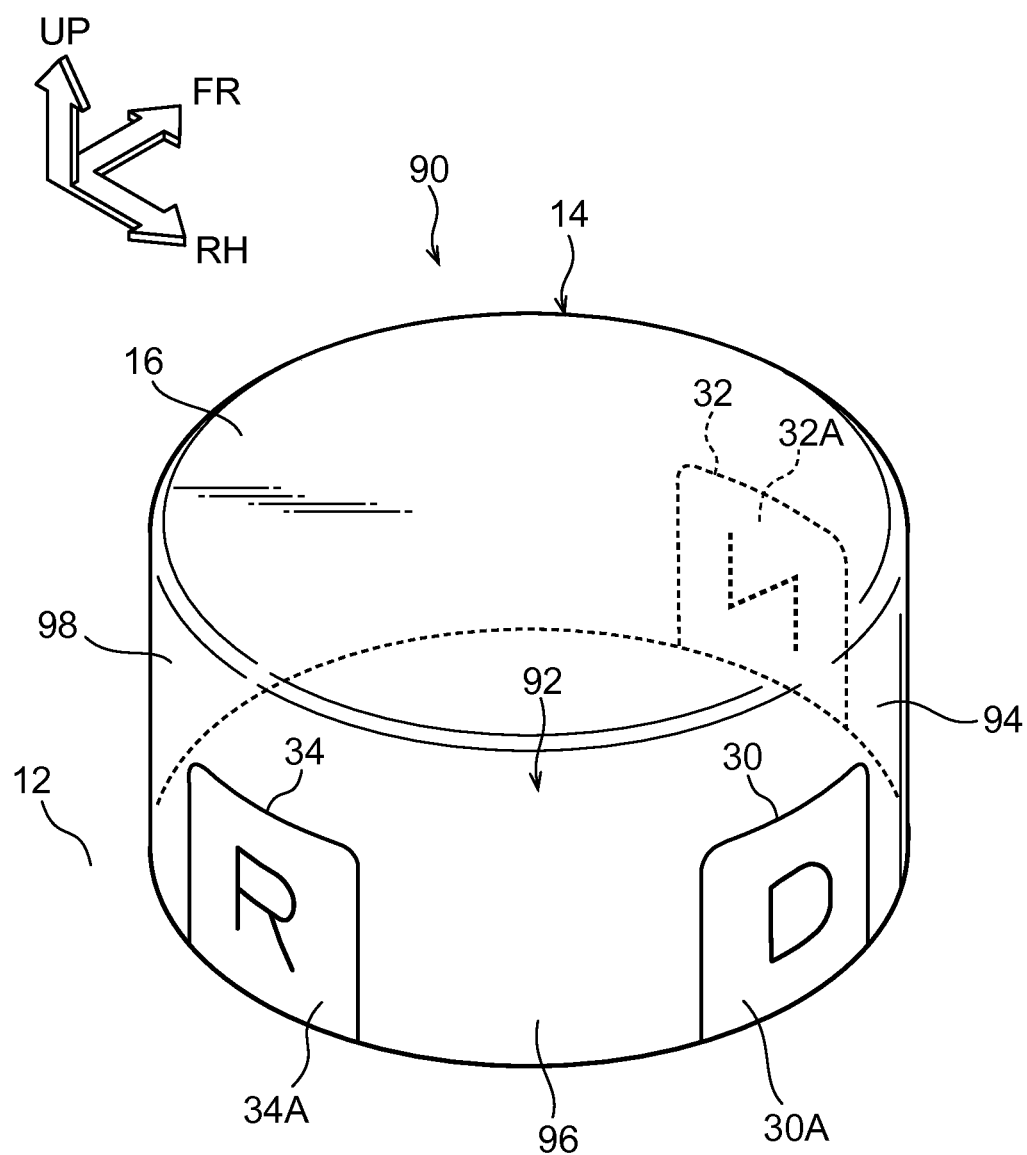
FIG. 7 is a perspective view illustrating a shift device according to a sixth exemplary embodiment of the present invention, as viewed diagonally from the rear right of a vehicle.

FIG. 7 is a perspective view illustrating a shift device 90 according to a sixth exemplary embodiment of the present invention, as viewed diagonally from the rear right of the vehicle.

The shift device 90 according to the present exemplary embodiment has substantially the same configuration as in the first exemplary embodiment; however differs in the following respects.

As illustrated in FIG. 7, the shift device 90 according to the present exemplary embodiment is configured with a circular cylinder shaped installation body 14, and an upper face (projection end face) of the installation body 14 configures a circular, flat plane shaped placement face 16.

A circumferential face of the installation body 14 configures an installation face 92. The installation face 92 is curved in a projecting shape to configure a circular circumferential face profile, and is disposed parallel to the up-down direction.

A "D" switch 30 is installed at a lower side portion of a vehicle right side end portion of the installation face 92, and a "D" operation face 30A of the "D" switch 30 is configured with a rectangular shape as viewed face-on. The "D" operation face 30A is curved in a projecting shape to configure a circular circumferential face profile, and the "D" operation face 30A is disposed in the same plane as the installation face 92. The press-operation direction of the "D" switch 30 ("D" operation face 30A) is set toward the left of the vehicle (horizontal direction).

An "N" switch 32 is installed at a lower side portion of a vehicle front side end portion of the installation face 92, and an "N" operation face 32A of the "N" switch 32 is configured with a rectangular shape as viewed face-on. The "N" operation face 32A is curved in a projecting shape to configure a circular circumferential face profile, and the "N" operation face 32A is disposed in the same plane as the installation face 92. The press-operation direction of the "N" switch 32 ("N" operation face 32A) is set toward the rear of the vehicle (horizontal direction).

An "R" switch 34 is installed at a lower side portion of a vehicle rear side end portion of the installation face 92, and an "R" operation face 34A of the "R" switch 34 is configured with a rectangular shape as viewed face-on. The "R" operation face 34A is curved in a projecting shape to configure a circular circumferential face profile, and the "R" operation face 34A is disposed in the same plane as the installation face 92. The press-operation direction of the "R" switch 34 ("R" operation face 34A) is set toward the front of the vehicle (horizontal direction).

A circumferential face of the installation body 14 on a vehicle front diagonal right side configures a front separation face 94 serving as a separation portion (first separation portion). The front separation face 94 is curved in a projecting shape to configure a circular circumferential face profile, and separates the "D" switch 30 from the "N" switch 32.

A circumferential face of the installation body 14 on a vehicle rear diagonal right side configures a rear separation face 96 serving as a separation portion (second separation portion). The rear separation face 96 is curved in a projecting shape to configure a circular circumferential face profile, and separates the "D" switch 30 from the "R" switch 34.

A circumferential face on a vehicle left side of the installation body 14 configures a left separation face 98 serving as a separation portion (third separation portion). The left separation face 98 is curved in a projecting shape to configure a circular circumferential face profile, and separates the "N" switch 32 from the "R" switch 34.

Note that the present exemplary embodiment enables similar operation and advantageous effects to those of the first exemplary embodiment, with the exception of operation and advantageous effects due to the right installation face 24, the front installation face 26, and the front side connection face 38 being connected to each other through connection faces, and operation and advantageous effects due to the "N" switch 32 and the "R" switch 34 not opposing each other across the installation body 14.

In particular, in the installation body 14, the installation face 92 is configured as a curved face, and the "D" switch 30, the "N" switch 32, and the "R" switch 34 are installed to the installation face 92. Moreover, the "D" switch 30 and the "N" switch 32 are separated from each other by the front separation face 94 of the installation face 92, the "D" switch 30 and the "R" switch 34 are separated from each other by the rear separation face 96 of the installation face 92, and the "N" switch 32 and the "R" switch 34 are separated from each other by the left separation face 98 of the installation face 92.

This thereby enables the driver to easily identify the positions of the "D" switch 30, the "N" switch 32, and the "R" switch 34 without looking at the installation body 14, by discerning the curved faces (including the curved faces of the front separation face 94, the rear separation face 96, and the left separation face 98) of the installation face 92 with their left hand 18 (and the fingers thereof).

Note that in the third exemplary embodiment to the sixth exemplary embodiment, the "N" switch 32 and the "R" switch 34 oppose each other across the installation body 14. However, in the third exemplary embodiment to the sixth exemplary embodiment, configuration may be made similarly to in the first exemplary embodiment and the second exemplary embodiment, such that the "N" switch 32 and the "R" switch 34 do not oppose each other across the installation body 14.

In the second exemplary embodiment, the intermediate connection face 52 (including the step connection face 54) is provided at the installation body 14 of the first exemplary embodiment. However, an intermediate connection face 52 (including a step connection face 54) may also be provided at the installation body 14 in the third exemplary embodiment to the sixth exemplary embodiment.

In the fifth exemplary embodiment, the protruding or recessed peripheral portion is provided at the periphery of the installation body 14 of the fourth exemplary embodiment. However, a protruding or recessed peripheral portion may be provided at the periphery of the installation body 14 of the first exemplary embodiment to the third exemplary embodiment, or of the sixth exemplary embodiment.

In the first exemplary embodiment to the sixth exemplary embodiment, the "D" operation face 30A of the "D" switch 30, the "N" operation face 32A of the "N" switch 32, and the "R" operation face 34A of the "R" switch 34 are respectively disposed in the same plane as the right installation face 24 or the installation face 92, the front installation face 26 or the installation face 92, or the rear installation face 28 or the installation face 92. However, at least one out of the "D" operation face 30A of the "D" switch 30, the "N" operation face 32A of the "N" switch 32, or the "R" operation face 34A of the "R" switch 34 may be respectively disposed out of plane (may be disposed offset) with respect to the right installation face 24 or the installation face 92, the front installation face 26 or the installation face 92, or the rear installation face 28 or the installation face 92.

In the first exemplary embodiment to the sixth exemplary embodiment, the press-operation direction of at least one of the "D" switch 30 ("D" operation face 30A), the "N" switch 32 ("N" operation face 32A), or the "R" switch 34 ("R" operation face 34A) may be inclined with respect to a direction orthogonal to at least one of the "D" operation face 30A, the "N" operation face 32A, or the "R" operation face 34A.

In the first exemplary embodiment to the sixth exemplary embodiment, at least one of the "D" operation face 30A of the "D" switch 30, the "N" operation face 32A of the "N" switch 32, and the "R" operation face 34A of the "R" switch 34 may be provided with a projection or a recess. This thereby enables the driver to easily identify the position of at least one of the "D" operation face 30A, the "N" operation face 32A, or the "R" operation face 34A by discerning the recess or projection with their left hand 18 (and the fingers thereof), without looking at the installation body 14. This thereby enables improved ease of operation of at least one of the "D" operation face 30A, the "N" operation face 32A, or the "R" operation face 34A.

In the first exemplary embodiment to the sixth exemplary embodiment, the "D" switch 30, the "N" switch 32, and the "R" switch 34 are installed to the installation body 14. However, one or more of the switches (for example the "N" switch 32) may be installed at the periphery of the installation body 14. This thereby enables the driver to distinguish easily between switches on the installation body 14 and switches at the periphery of the installation body 14, without looking at the installation body 14 or the periphery of the installation body 14, by discerning the installation body 14 with their left hand 18 (and the fingers thereof), thereby enabling improved ease of operation of the plural switches.

The first exemplary embodiment to the sixth exemplary embodiment are installed with the "D" switch 30, the "N" switch 32, and the "R" switch 34. However, configuration may be made such that any one out of the "D" switch 30, the "N" switch 32, or the "R" switch 34 is not installed. Moreover, switches other than the "D" switch 30, the "N" switch 32, and the "R" switch 34 may be additionally installed (for example, a "P" switch (parking switch) that is operated to place the shift range of the automatic transmission in a "P" range (parking range)). Moreover, another switch may be installed in the place of any out of the "D" switch 30, the "N" switch 32, or the "R" switch 34.

In the first exemplary embodiment to the sixth exemplary embodiment, the vehicle is configured as a right-hand drive vehicle, and the "D" switch 30 is disposed at the vehicle right side of the "N" switch 32 and the "R" switch 34. However, if the vehicle is configured as a left-hand drive vehicle, the vehicle left-right direction of the shift device 10, 50, 60, 70, 80, 90 may be reversed, and, for example, the "D" switch 30 may be disposed at the vehicle left side of the "N" switch 32 and the "R" switch 34.

Moreover, in the first exemplary embodiment to the sixth exemplary embodiment, the shift device 10, 50, 60, 70, 80, 90 is a floor-mounted type, and is located on the floor section of the vehicle compartment. However, the shift device 10, 50, 60, 70, 80, 90 may be disposed on a steering column, or on a vehicle instrument panel.

The entire contents of the disclosure of Japanese Patent Application No. 2012-268702, filed on Dec. 7, 2012, are incorporated by reference in the present specification.

EXPLANATION OF THE REFERENCE NUMERALS 10 shift device
14 installation body
24 right installation face (installation face)
25 front installation face (installation face)
28 rear installation face (installation face)
30 "D" switch (switch)
32 "N" switch (switch)
34 "R" switch (switch)
36 front connection face (connection portion, separation portion, connection face)
38 front side connection face (connection portion, separation portion, connection face)
40 rear connection face (connection portion, separation portion, connection face)
42 rear side connection face (connection portion, separation portion, connection face)
44 left connection face (connection portion, separation portion, connection face)
50 shift device
52 intermediate connection face (connection portion, separation portion, connection face)
54 step connection face (connection portion, separation portion, connection face)
60 shift device
64 front connection face (connection portion, separation portion, connection face)
66 rear connection face (connection portion, separation portion, connection face)
68 left connection face (connection portion, separation portion, connection face)
70 shift device
72 front corner portion (connection portion, separation portion)
74 rear corner portion (connection portion, separation portion)
80 shift device
82 peripheral recess (peripheral portion)
90 shift device
92 installation face (installation face)
94 front separation face (separation portion)
96 rear separation face (separation portion)
98 left separation face (separation portion)

The invention claimed is:

1. A shift device, comprising:
a plurality of switches that are operated to change a shift range of a transmission; and
an installation body that is provided with a plurality of installation faces on which the switches are respectively installed, and that is provided with a connection portion that connects the installation faces to each other and disposes the switches apart from each other.

2. A shift device, comprising:
a plurality of switches that are operated to change a shift range of a transmission; and
an installation body that is provided with a specific number of installation faces on which the plurality of switches are installed such that the plurality of switches have different operation directions to each other, and that is provided with a separation portion that disposes the switches apart from each other.

3. A shift device, comprising:
a plurality of switches that are operated to change a shift range of a transmission; and
an installation body that is provided with an installation face with a curved face profile, on which the plurality of switches are installed, and that is provided with a separation portion that disposes the switches apart from each other.

4. The shift device of claim 1, wherein at least one installation face of the plurality of installation faces has a curved face profile.

5. The shift device of claim 1, wherein the installation body projects outward, and at least one switch of the plurality of switches is operated toward a side orthogonal to a projection direction of the installation body.

6. The shift device of claim 1, wherein the installation body projects outward, and the plurality of switches are disposed around a projection direction of the installation body.

7. A shift device, comprising:
a plurality of switches that are operated to change a shift range of a transmission; and
an installation body that is provided with a plurality of installation faces on which the switches are respectively installed, and that is provided with a connection portion that connects the installation faces to each other and separates the switches from each other,
wherein a plurality of connection faces, which are provided at the installation body between the installation faces, connect the installation faces to each other.

8. The shift device of claim 1, wherein the installation body includes at least a pair of opposing installation faces, and wherein switches installed on the pair of opposing installation faces are offset from each other across the installation body.

9. The shift device of claim 1, wherein one of a protruding peripheral portion or a recessed peripheral portion is provided at a periphery of the installation body.

10. The shift device of claim 1, wherein at least one switch of the plurality of switches is installed at a periphery of the installation body.

11. The shift device of claim 1, wherein the area of each of the plurality of switches is smaller than the area of the installation face upon which it is installed such that the intervening portions of the installation faces of different switches further serve to dispose the switches apart from each other.

12. The shift device of claim 2, wherein the separation portion of the installation body includes surfaces that are disposed between the installation faces.

* * * * *